United States Patent
Hill et al.

(10) Patent No.: US 9,133,673 B2
(45) Date of Patent: Sep. 15, 2015

(54) HYDRAULICALLY DRIVEN TANDEM TRACTOR ASSEMBLY

(75) Inventors: Stephen D. Hill, Pearland, TX (US); Cecilia Prieto, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 454 days.

(21) Appl. No.: 12/419,375

(22) Filed: Apr. 7, 2009

(65) Prior Publication Data

US 2009/0218105 A1    Sep. 3, 2009

Related U.S. Application Data

(63) Continuation-in-part of application No. 11/772,181, filed on Jun. 30, 2007, now abandoned.

(60) Provisional application No. 60/883,115, filed on Jan. 2, 2007, provisional application No. 61/047,151, filed on Apr. 23, 2008.

(51) Int. Cl.
*E21B 23/08* (2006.01)
*E21B 23/04* (2006.01)
*E21B 4/18* (2006.01)
*E21B 23/14* (2006.01)
*F16L 55/30* (2006.01)
*E21B 23/00* (2006.01)
*F16L 101/70* (2006.01)

(52) U.S. Cl.
CPC . *E21B 23/04* (2013.01); *E21B 4/18* (2013.01); *E21B 23/14* (2013.01); *F16L 55/30* (2013.01); *E21B 2023/008* (2013.01); *F16L 2101/70* (2013.01)

(58) Field of Classification Search
CPC .... E21B 4/18; E21B 17/1014; E21B 17/1021
USPC .............................. 166/378, 381, 383, 241.6
See application file for complete search history.

(56) References Cited

U.S. PATENT DOCUMENTS

| | | |
|---|---|---|
| 5,332,048 A | 7/1994 | Underwood et al. |
| 5,810,080 A | 9/1998 | Meynier |
| 6,082,461 A * | 7/2000 | Newman et al. ............... 166/381 |
| 6,089,323 A | 7/2000 | Newman et al. |
| 6,112,809 A | 9/2000 | Angle |
| 6,241,031 B1 | 6/2001 | Beaufort |
| 6,273,189 B1 | 8/2001 | Gissler |
| 6,347,674 B1 | 2/2002 | Bloom |
| 6,367,366 B1 | 4/2002 | Bloom |
| 6,427,786 B2 | 8/2002 | Beaufort |

(Continued)

FOREIGN PATENT DOCUMENTS

| | | |
|---|---|---|
| GB | 2346908 | 8/2000 |
| GB | 2351308 | 12/2000 |

(Continued)

*Primary Examiner* — Elizabeth Gitlin
(74) *Attorney, Agent, or Firm* — Michael L. Flynn; Timothy Curington; Robin Nava

(57) ABSTRACT

A tractor assembly is provided for downhole advancement in a well. The assembly comprises an uphole tractor and a downhole tractor. Each tractor in turn comprises uphole and downhole housings to accommodate uphole and downhole anchors with the anchors configured for interchangeably engaging a wall of the well. Additionally, a hydraulically driven piston is disposed through each of the housings of each tractor for actuation of the engaging.

23 Claims, 6 Drawing Sheets

(56) References Cited

U.S. PATENT DOCUMENTS

| | | |
|---|---|---|
| 6,464,003 B2 | 10/2002 | Bloom |
| 6,467,557 B1 | 10/2002 | Krueger |
| 6,478,097 B2 | 11/2002 | Bloom |
| 6,629,568 B2 | 10/2003 | Post et al. |
| 6,640,894 B2 | 11/2003 | Bloom |
| 6,679,341 B2 | 1/2004 | Bloom |
| 6,691,587 B1 * | 2/2004 | King ........................ 74/89.35 |
| 6,715,559 B2 | 4/2004 | Bloom |
| 6,745,854 B2 | 6/2004 | Bloom |
| 6,868,906 B1 | 3/2005 | Vail |
| 6,935,423 B2 | 8/2005 | Kusmer |
| 6,938,708 B2 | 9/2005 | Bloom |
| 7,048,047 B2 | 5/2006 | Bloom |
| 7,080,700 B2 | 7/2006 | Bloom |
| 7,080,701 B2 | 7/2006 | Bloom |
| 7,121,364 B2 | 10/2006 | Mock |
| 7,174,974 B2 | 2/2007 | Bloom |
| 2002/0007971 A1 | 1/2002 | Beaufort et al. |
| 2002/0029908 A1 | 3/2002 | Bloom |
| 2002/0104686 A1 | 8/2002 | Bloom |
| 2003/0116356 A1 | 6/2003 | Bloom |
| 2003/0121703 A1 | 7/2003 | Bloom |
| 2003/0188875 A1 | 10/2003 | Bloom |
| 2004/0245018 A1 | 12/2004 | Bloom |
| 2005/0072577 A1 | 4/2005 | Freeman |
| 2005/0082055 A1 * | 4/2005 | Bloom et al. ............. 166/213 |
| 2005/0145415 A1 * | 7/2005 | Doering et al. ............. 175/24 |
| 2005/0247488 A1 | 11/2005 | Mock |
| 2005/0252686 A1 | 11/2005 | Bloom |
| 2006/0196694 A1 | 9/2006 | Bloom |
| 2006/0196696 A1 | 9/2006 | Bloom |
| 2008/0066963 A1 | 3/2008 | Sheiretov et al. |
| 2008/0073077 A1 | 3/2008 | Tunc et al. |

FOREIGN PATENT DOCUMENTS

| | | | |
|---|---|---|---|
| GB | 2362405 | 11/2001 | |
| GB | 2370056 | 6/2002 | |
| GB | 2378468 | 2/2003 | |
| GB | 2378469 | 2/2003 | |
| GB | 2380755 | 4/2003 | |
| GB | 2389135 | 12/2003 | |
| GB | 2413816 | 11/2005 | |
| GB | 2414499 | 11/2005 | |
| GB | 2434819 A | 8/2007 | |
| SU | 1236098 A1 | 6/1986 | |
| WO | WO 95/21987 * | 8/1995 | ............. E21B 23/00 |
| WO | 9708418 | 3/1997 | |
| WO | 0036266 | 6/2000 | |
| WO | 0046481 | 8/2000 | |
| WO | 0109478 | 2/2001 | |
| WO | 0244509 | 6/2002 | |
| WO | 2004072433 | 8/2004 | |
| WO | 2005090739 | 9/2005 | |
| WO | 2008024859 A1 | 2/2008 | |

* cited by examiner

HYDRAULICALLY DRIVEN TANDEM TRACTOR ASSEMBLY

CROSS REFERENCE TO RELATED APPLICATION(S)

This Patent Document is a continuation-in-part claiming priority under 35 U.S.C. §120 to U.S. application Ser. No. 11/772,181 entitled Hydraulically Driven Tractor filed on Jun. 30, 2007 now abandoned, incorporated herein by reference in its entirety and also in turn claiming priority under 35 U.S.C. §119(e) to U.S. Provisional Application Ser. No. 60/883,115, entitled Flow Driven Coiled Tubing Tractor, filed on Jan. 2, 2007, which is also incorporated herein by reference in its entirety. This Patent Document also claims priority under 35 U.S.C. §119(e) to U.S. Provisional Application Ser. No. 61/047,151, entitled Tandem Tractoring, filed on Apr. 23, 2008, which is incorporated herein by reference.

FIELD

Embodiments described relate to tractors for pulling coiled tubing and other equipment through an underground well. In particular, embodiments of multiple tractor assemblies are described for pulling equipment downhole in a hydraulically driven manner.

BACKGROUND

Coiled tubing operations may be employed at an oilfield to deliver a downhole tool to an operation site for a variety of well intervention applications such as well stimulation, the forming of perforations, or the clean-out of debris from within the well. Coiled tubing operations are particularly adept at providing access to highly deviated or tortuous wells where gravity alone fails to provide access to all regions of the wells. During a coiled tubing operation, a spool of pipe (i.e., a coiled tubing) with a downhole tool at the end thereof is slowly straightened and forcibly pushed into the well. For example, a clean out tool may be delivered to a clean out site within the well in this manner to clean out sand or other undesirable debris thereat.

Unfortunately, the coiled tubing is susceptible to helical buckling as it is pushed deeper and deeper into the well. That is, depending on the degree of tortuousness and the well depth traversed, the coiled tubing will eventually buckle against the well wall and begin to take on the character of a helical spring. In such circumstances, continued downhole pushing on the coiled tubing simply lodges it more firmly into the well wall ensuring its immobilization (i.e. coiled tubing "lock-up") and potentially damaging the coiled tubing itself. This has become a more significant matter over the years as the number of deviated extended reach wells has become more prevalent. Thus, in order to extend the reach of the coiled tubing, a tractor may be incorporated into a downhole portion thereof for pulling the coiled tubing deeper into the well.

For a conventional tractor, power may be supplied downhole by way of an electric cable. However, unless the inner diameter of the coiled tubing is undesirably increased, this reduces the available internal flow space of the coiled tubing. Alternatively, the electric cable may be integrated into the wall of the coiled tubing. However, as a practical matter, this presents significant manufacturing challenges. In either case, the addition of electric cabling to the coiled tubing assembly may significantly increase the total weight thereof. This added load may play a significant role in the total achievable depth of the coiled tubing. Furthermore, given the independent nature of the coiled tubing and electric cable, other challenges may be presented in terms of the effort required to maintain compatible tension and control simultaneously through such separate lines of equipment.

In light of the complications presented by the incorporation of an electric cable, the tractor may be hydraulically driven as detailed in U.S. application Ser. No. 11/772,181 entitled Hydraulically Driven Tractor, incorporated herein by reference in its entirety as noted above. That is, given the availability of hydraulics provided via coiled tubing, the use of an electric cable may be avoided in certain circumstances. As such, avoiding space issues and other complications as noted above may be appreciated.

Unfortunately, regardless of the manner of powering the tractor, the overall reach of coiled tubing in a well remains limited. This is due in large part to the fact that the load carrying capacity of any given tractor faces its own limitations. For example, in the case of a cable powered tractor, sending more power downhole will eventually result in damaging of the tractor as opposed to extending the reach of the coiled tubing assembly. The hydraulically powered tractor on the other hand avails itself the possibility of either increasing pressure or reducing flow rate in order to increase overall load carrying capacity. Nevertheless, at some point increased pressure also results in tractor damage while slowing down of the flow rate slows the speed of the operation and may even halt it altogether. Overall, the load carrying capacity of a tractor in a conventionally sized well may be limited, for example, in many cases to no more than between about 5,000 lbs and 7,500 lbs.

At present, wells of ever increasing depth and deviation are being employed, often well beyond 10,000 feet in depth, and often in need of interventional operations that traditionally lend themselves to the utilization of coiled tubing. However, given the above noted load limitations of available tractor assemblies, the extent of the reach of the coiled tubing may be affected by a host of factors related to the overall load, such as the degree of deviated character of the well and the increasing weight of the coiled tubing assembly as it is advanced further and further into the well. Generally speaking, a conventional tractor driven operation employing standard coiled tubing (i.e. coiled tubing that is between about 2" and about 3½" in diameter) may have an effective reach of less than about 10,000 feet in a highly deviated well.

SUMMARY

A tractor assembly is provided for downhole advancement in a well. The assembly includes an uphole tractor and a downhole tractor. Each tractor in turn includes uphole and downhole housings to accommodate uphole and downhole anchors with the anchors configured for interchangeably engaging a wall of the well. Additionally, a hydraulically driven piston is disposed through each of the housings of each tractor for actuation of the engaging.

In another embodiment, the assembly may include uphole and downhole tractors. A hydraulic line may thus be coupled to each of the tractors for hydraulically distributing a load accommodated by the assembly among the tractors. This may be achieved by configuring the line to accommodate a given flow rate. Additionally, the positioning of a choke in the line immediately adjacently uphole of the downhole tractor may aid in the distributing.

DETAILED DESCRIPTION

Embodiments are described with reference to certain downhole tandem tractoring operations. In particular, tractor aided coiled tubing clean out of downhole debris in a well is detailed below (see FIG. 3). However, other types of hydraulically driven tandem tractoring applications may employ techniques as detailed herein. Indeed, downhole applications aided by a hydraulically driven tandem tractor assembly may involve either active intervention as described herein or be more passive in nature such as a logging operation. Regardless, embodiments detailed herein involve the use of multiple tractors as part of a hydraulically driven tractor assembly for pulling a given load of, for example, coiled tubing and other downhole equipment. In fact, certain embodiments detailed herein include techniques for balancing the distribution of the load among the tractors of the assembly.

Figure 1:
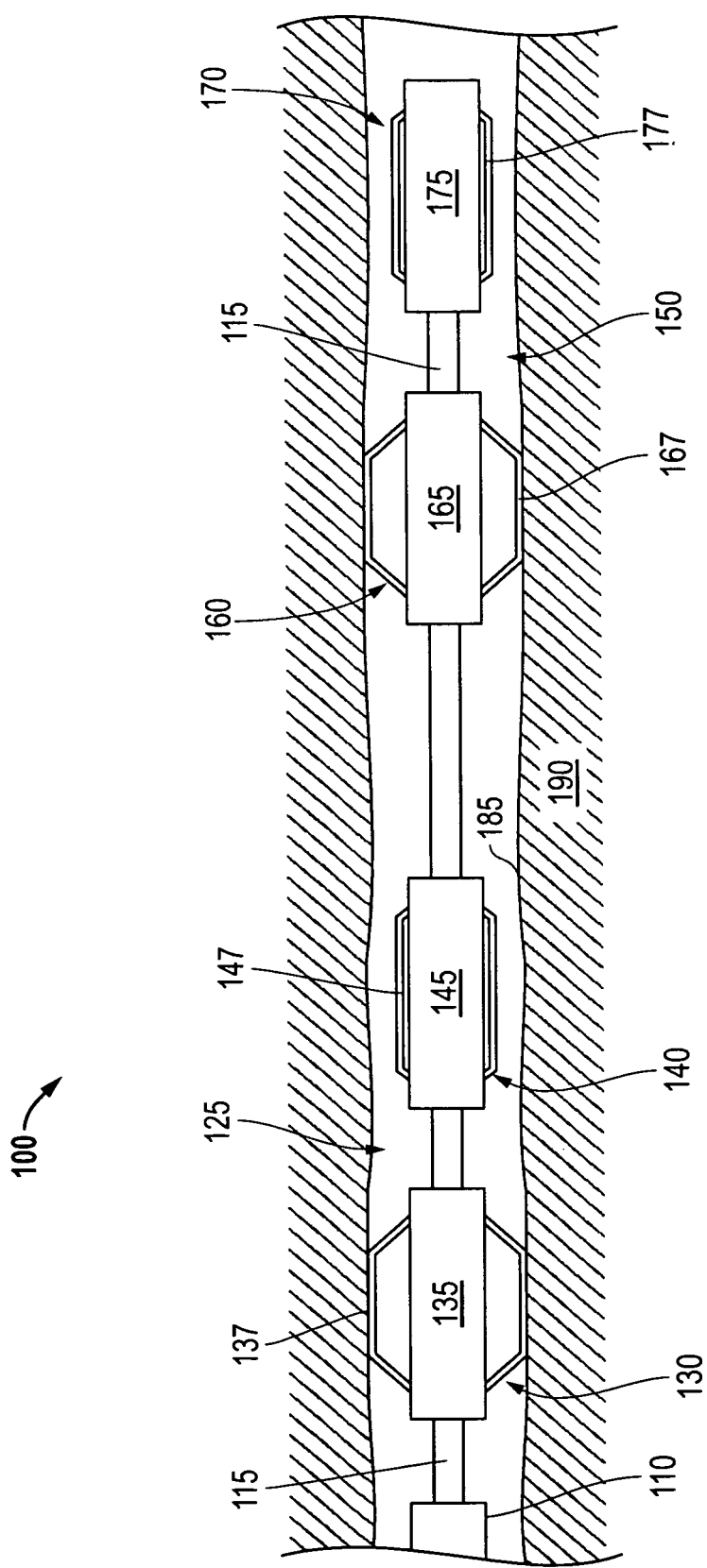
FIG. 1 is a side partially sectional view of an embodiment of a hydraulically driven tandem tractor assembly disposed in a well.

Referring now to FIG. 1, a hydraulically driven tandem tractor assembly 100 is depicted within a well 180 running through a formation 190. In the embodiment shown, the assembly 100 is configured to pull coiled tubing 110 to significant well depths if need be and traverse deviated portions of the well 180. For example, the assembly 100 is equipped with multiple tractors 125, 150 in order to improve the load carrying capacity thereof. Thus, as detailed further below, the hydraulically driven assembly 100 may reach depths exceeding 10,000 feet even while traversing a substantially horizontal well 180. As such, equipment such as a clean out tool 370 may be delivered to a downhole location of extended depth for an application thereat (see FIG. 3).

The above-noted tractors 125, 150 of the assembly 100 are each equipped with distinct sondes (130, 140 and 160, 170, respectively). Each sonde 130, 140, 160, 170 is made up of housings 135, 145, 165, 175 which accommodate a set of anchor arms 137, 147, 167, 177. As detailed further below, the assembly 100 is configured to employ movement of the housings 135, 145, 165, 175 and the arms 137, 147, 167, 177 in a coordinated manner so as to achieve advancement of the assembly 100 through the well 180. More particularly, a piston 115 is provided through each of the housings 135, 145, 165, 175. As detailed further below, hydraulics may be employed to shift the position of the housings 135, 145, 165, 175 relative to the piston 115 and to interchangeably actuate the arms 137, 147, 167, 177. Thus, an inchworming-like advancement of the assembly 100 through the well 180 may be attained.

Figure 2:
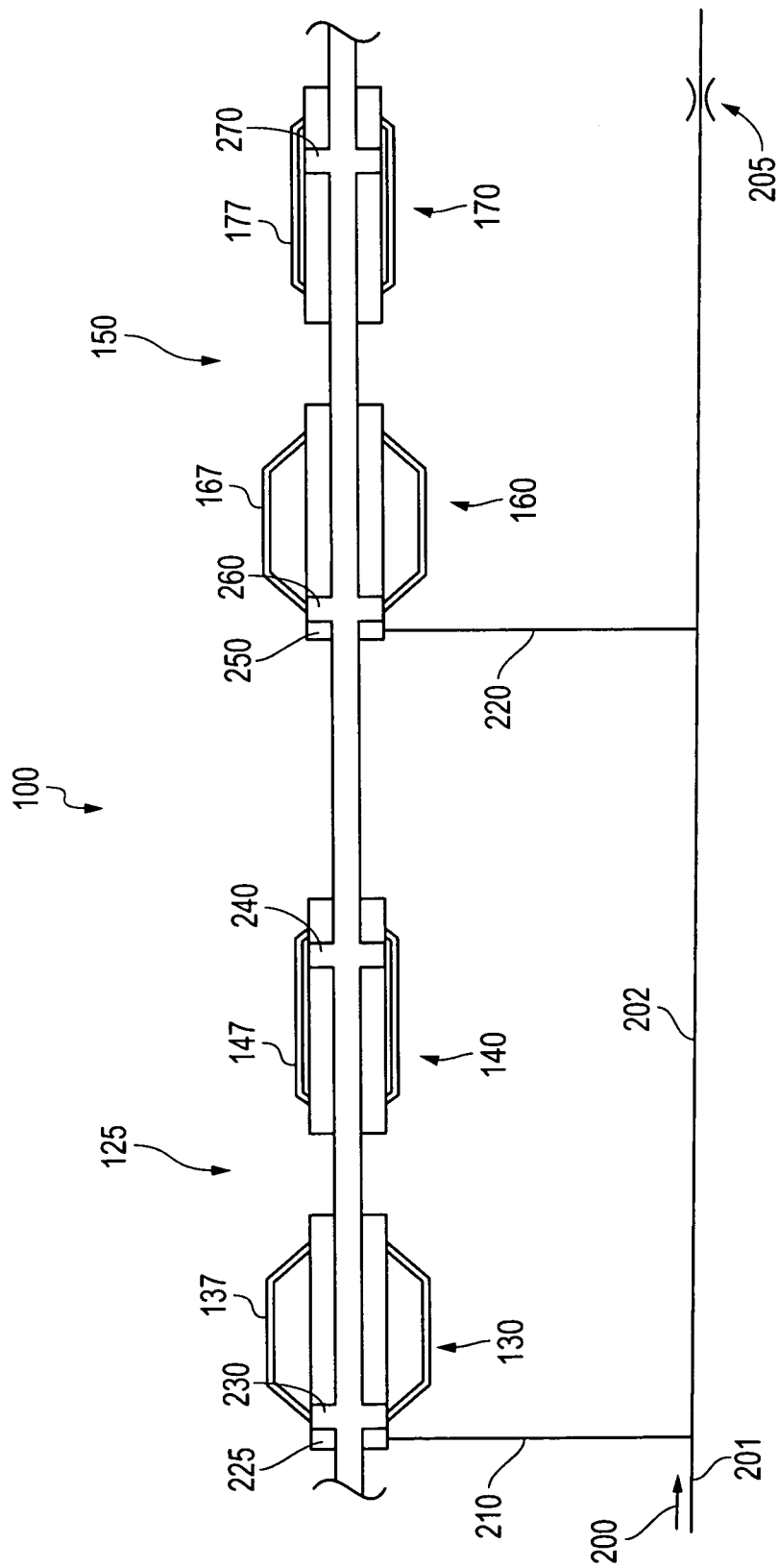
FIG. 2 is a schematic sectional view of the hydraulically driven tandem tractor assembly of FIG. 1.

Referring now to FIG. 2, a schematic sectional view of the hydraulically driven tandem tractor assembly 100 is shown. Each tractor 125, 150 of the assembly 100 is hydraulically driven via techniques detailed in U.S. application Ser. No. 11/772,181 entitled Hydraulically Driven Tractor. Namely, as detailed further below, a primary hydraulic line 201 is provided that is coupled to hydraulics of the coiled tubing 110 so as to divert hydraulic power for downhole tractoring. However, in this case, the diversion of hydraulic power is twofold. That is, hydraulic power is simultaneously diverted to separate uphole 125 and downhole 150 tractors.

In powering the tractors 125, 150, the load capacities thereof may tend to vary. Nevertheless, the addition of a second tractor still raises the cumulative load capacity of the assembly 100 significantly, for example by at least about 150%. More specifically, the uphole tractor 125 may contribute a given amount to the total load capacity of the assembly 100 whereas the downhole tractor 150 is configured to contribute an amount that is at least about half the given amount. Additionally, as detailed below, techniques may be employed in order to tailor the load carrying capacities of the tractors 125, 150 in order to obtain a substantially balanced load therebetween. In this manner, unbalanced wear on the uphole tractor 125 may be avoided and a greater total load capacity of the assembly 100 achieved.

Continuing now with reference to FIG. 2, the primary hydraulic line 201 accommodates a given hydraulic flow of fluid (graphically depicted by arrow 200). For example, in one embodiment, a flow of about 2 barrels per minute (BPM) at 2,000 psi may be provided through the primary line 201. This flow 200 may itself be bled off from a hydraulic source of substantially higher flow rate and pressure that is run through the coiled tubing 110 (see FIG. 1). Regardless, a choke 205 may be employed to divert a flow of about 0.1 BPM from the primary line 201 and along an uphole tractor line 210 to an uphole chamber 225 of the first uphole sonde 130. When factoring in a conventional pressure drop along the line 210, this may translate to a delivered pressure in the chamber 225 of about 1,300 psi, for example.

The pressure provided to the chamber 225 as noted above may act upon a first uphole piston head 230 in order to aid in driving the assembly 100 from left to right as shown. For example, the first uphole sonde 130 may be immobilized in the well 180 of FIG. 1 with extended arms 137. However, pressure on the piston head 230 may drive the piston 115 as well as the first 140 and second 170 downhole sondes in a downhole direction (e.g. due to the retracted nature of the arms 147, 177). All in all, for the example shown, the uphole tractor 125 may provide upwards of about 5,000 lbs. of load carrying capacity.

Continuing to examine the schematic of FIG. 2, it is apparent that hydraulic power may similarly be diverted along an intermediate line 202 to a downhole tractor line 220 in order to power the downhole tractor 150. Together, these lines 201, 202 make up the hydraulic supply for the tractor lines 210, 220. Thus, another 0.1 BPM may be diverted to the downhole tractor 150. However, given the added hydraulic distance presented by the intermediate line 202 and the downhole tractor line 220, the amount of pressure delivered to the uphole chamber 250 of the second uphole sonde 160 may be substantially less than the pressure delivered to the first uphole sonde 130. For example, a cumulative pressure drop of about 1,350 psi may be seen along the lines 202, 220 leading to the chamber 250. Thus, a pressure of about 650 psi may be employed to act upon the second uphole piston head 260 (e.g. about half that of the pressure provided to the uphole tractor 125 as described above). As such, the downhole tractor 150 may have a load carrying capacity of about 2,500 lbs.

In the embodiment described above, the downhole tractor 150 provides a load carrying capacity that is roughly half that of the uphole tractor 125 as described. However, when examining the assembly 100 as a whole, the utilization of a second tractor increases the load capacity by time and a half. That is, the load capacities of the tractors 125, 150 are cumulative. Thus, the addition of a second tractor takes the load carrying capacity of the assembly 100 up from 5,000 lbs. to 7,500 lbs. Thus, even where the load accommodated by the assembly 100 is left relatively unbalanced, the total load capacity of the assembly 100 is markedly increased. In practical terms, this may translate to extending the reach of the assembly 100 by several thousand feet into a well 180 such as that of FIG. 1. Furthermore, as detailed below, added techniques and features may be employed to substantially balance the load and further increase the overall load carrying capacity of the assembly 100.

Continuing with reference to FIG. 2, as the first 230 and second 260 uphole piston heads reach the end of travel within their respective sondes 130, 160, pressure may be built up at the downhole side of first 240 and second 270 downhole piston heads. In this manner, the first 140 and second 170 downhole sondes may be shifted downhole and eventually anchored. As such, the first 130 and second 160 uphole sondes may be de-anchored. According to techniques detailed in U.S. application Ser. No. 11/772,181, these mechanics may proceed in a continuous manner without interruption of the movement of the piston 115 in a downhole direction. Additionally, with added reference to FIG. 1, anchoring of the assembly 100 may be continuously maintained throughout the downhole advancement by ensuring that at least one pair of sondes (e.g. the uphole pair 130, 160 or the downhole pair 140, 170) is engaged with the well wall 185 at any given point in time. As described in U.S. application Ser. No. 11/772,181, this may help to ensure avoidance of any recoil of the assembly 100 in an uphole direction.

Figure 3:
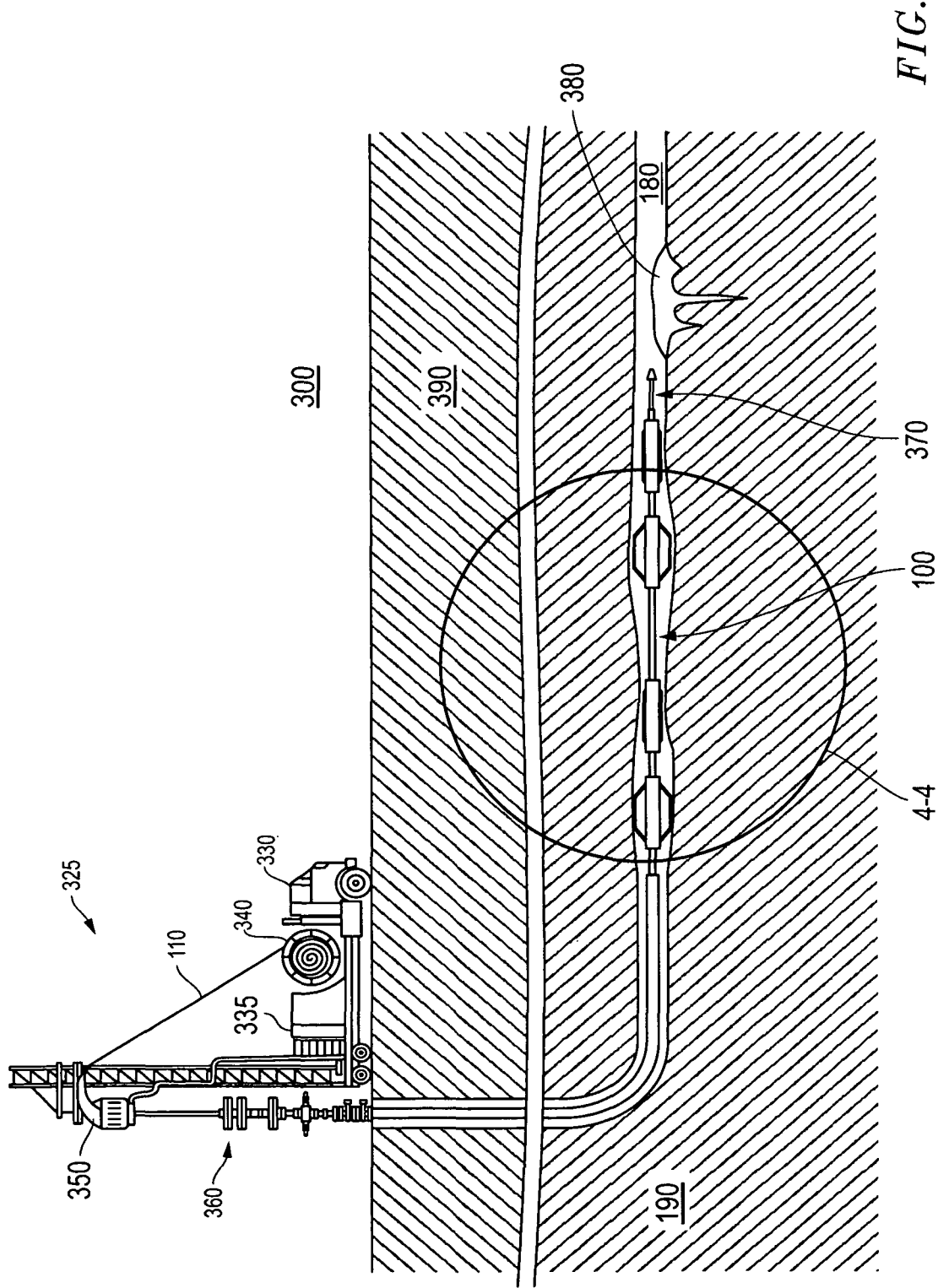
FIG. 3 is a sectional overview of the hydraulically driven tandem tractor assembly of FIG. 1 disposed in a well at an oilfield.

Referring now to FIG. 3, a sectional overview of an oilfield 300 is shown. In this view, the deployment of the hydraulically driven tandem tractor assembly 100 within the well 180 may be seen in a practical context. For example, the assembly 100 is shown having traversed several thousand feet through formation layers 390, 190 on its way to a relatively horizontal section of the well 180. Such a deployment, perhaps to beyond 10,000 feet into the well 180 may be made possible by the utilization of the tandem tractor assembly 100 which is equipped with a load carrying capacity of at least about 7,500 lbs. as detailed above. In the embodiment shown, this deployment may be for the purpose of delivering and operating a clean out tool 370 to remove debris 380. Although, the tandem tractor assembly 100 may be employed to deliver tools for a host of other applications as well.

The assembly 100 may be delivered to the oilfield 300 by way of a mobile coiled tubing truck 330 which accommodates a coiled tubing reel 340. The truck 330 may also provide a control unit 335 to direct the clean out application as well as the deployment of the assembly 100 and coiled tubing 110. As depicted, the coiled tubing 110 is directed through a conventional injector 350 and to a blowout preventor stack 360 and other valving to help effectively guide and advance the coiled tubing 110 and assembly 100 to the clean out site.

Figure 4:
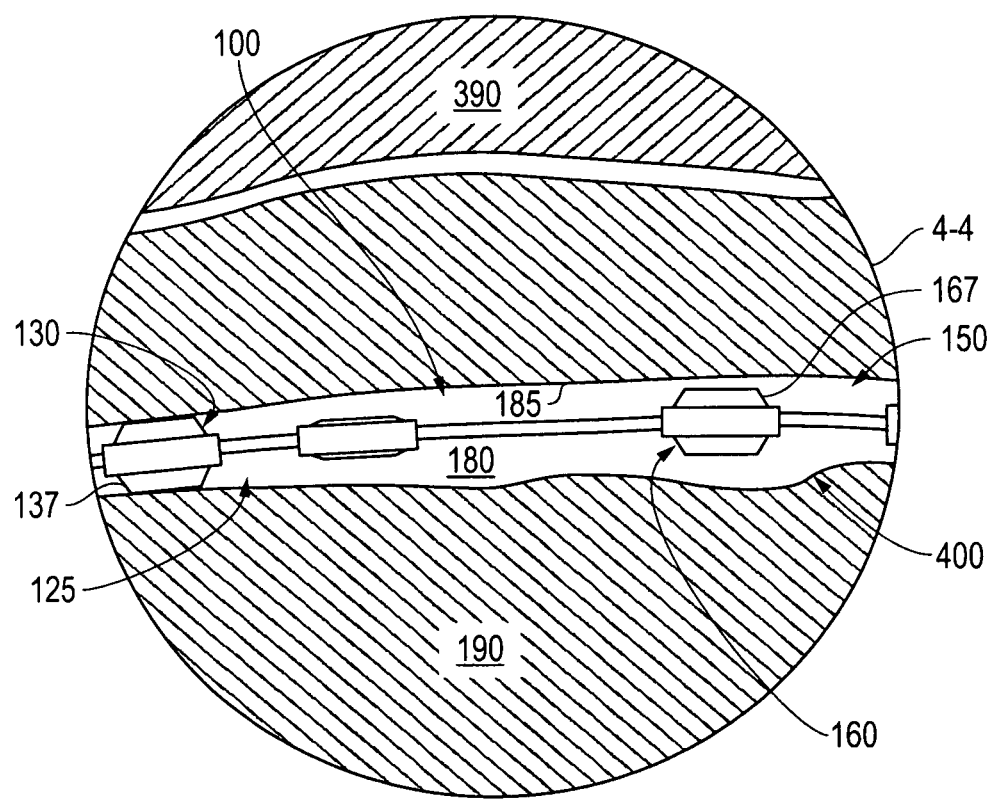
FIG. 4 is an enlarged view of uphole and downhole tractors of the assembly of FIG. 1 taken from 4-4 of FIG. 3.

Continuing now with reference to FIG. 4, an enlarged view of a portion of the assembly 100 is shown taken from 4-4 of FIG. 3. In this view, the uphole tractor 125 is shown with the first uphole sonde 130 firmly anchored by its arms 137 against the well wall 185. However, a close look at the well wall 185 reveals that the well 180 is of an uncased or open hole variety. This may be seen with the variable diameter of the well 180 which fails to remain uniform and may be less than structurally sound. Indeed, FIG. 4 reveals a washout location 400 having a diameter substantially greater than the limits of the arms 167 of the downhole tractor 150. As such, while the uphole tractor 125 is firmly anchored, the downhole tractor 150 is left unsecured relative to the well 180. That is, with added reference to FIGS. 2 and 3, the arms 177 of the second downhole sonde 170 are retracted while those of the second uphole sonde 160 are open (yet, unable to anchor against the well wall 185 at the washout location 400).

In the circumstance described above, the downhole tractor 150 is unable to anchor due to the diameter of the well 180 at the washout location 400. For example, the largest attainable anchoring diameter of the assembly 100 may be between about 8 and 10 inches, whereas the washout location 400 of FIG. 4, may present a well diameter of greater than about 12 inches. Nevertheless, the utilization of a tandem tractor assembly 100 as detailed herein may allow for continued tractoring through the well 180 and past the washout location 400.

That is, depending on the overall load involved, the redundancy provided by employing multiple tractors 125, 150, allows tractoring of the assembly 100 to continue downhole via the uphole tractor 125, even where the downhole tractor 150 has become temporarily ineffective. Such would not be possible with a single tractor assembly where encountering such a washout location 400 would likely render continued tractoring impractical. Indeed, depending on the total load involved, the utilization of a multiple or tandem tractor assembly 100 as detailed herein, may allow for tractoring to continue whenever one of the tractors 125, 150 is incapacitated, temporarily or otherwise, for any number of reasons. For example, these reasons may include mechanical failure of one of the tractors 125, 150 in addition to the emergence of a washout location 400 as described.

As detailed above, the tractors 125, 150 may be of differing load carrying capacity due to the hydraulics detailed in FIG. 2. Nevertheless, as also described, the overall capacity of the assembly 100 may be increased by a factor of about time and a half due to the addition of a second hydraulic tractor (contributing at least about 33% to the overall load capacity). However, with reference to FIGS. 5A and 5B detailed below, additional techniques and measures may be taken so as to substantially balance the load between the tractors 125, 150 of the assembly 100. In this manner, the overall load capacity of the assembly 100 may be markedly increased and undue strain on the uphole tractor 125 may be substantially avoided.

Figure 5A:
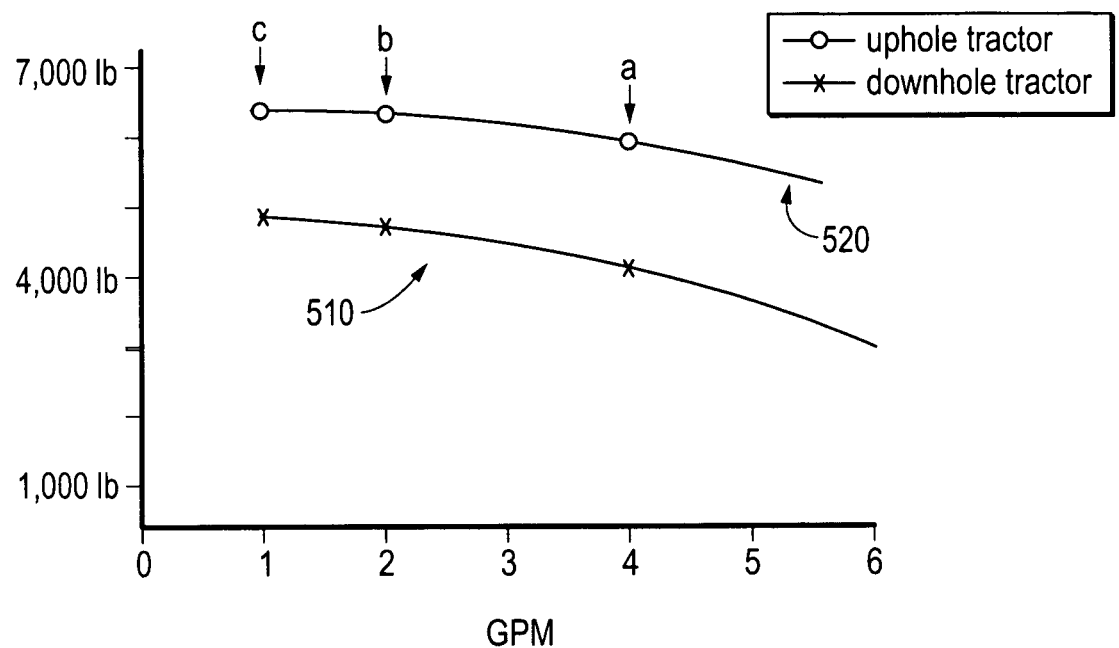
FIG. 5A is a chart depicting the effects of hydraulic flow on the load capacity of the tractors of the assembly of FIGS. 1-4 relative to one another.

Referring now to FIG. 5A, a chart is shown depicting the effects of hydraulic flow on the load capacity of the above detailed tractors of the assembly. In particular, hydraulic flow in gallons per minute is depicted, as opposed to barrels per minute, revealing an even finer detailed resolution on the effects of different flow rates through the assembly. So, for example, as noted above with reference to the schematic of FIG. 2, a flow rate of about 0.1 BPM may initially be applied to each tractor 125, 150, ultimately resulting in a total load capacity for the assembly 100 of about 7,500 lbs. for the described embodiment. As noted for this embodiment this load capacity may be broken down into a load of about 5,000 lbs. for the uphole tractor 125 and about 2,500 lbs. for the downhole tractor 150.

With specific reference to FIG. 5A, however, it is apparent that further reduction in the flow rate (e.g. below 0.1 BPM) may be employed to drive up the load capacity of each tractor. For example, the uphole tractor is represented by an uphole tractor curve 520. Upon examining the uphole tractor curve 520, it is apparent that as the flow rate is reduced, say from about 6 GPM down to about 1 GPM, the load capacity of the uphole tractor increases. In the embodiment shown, this increase takes the load capacity from about 5,000 lbs. up to about 6,250 lbs. Similarly, the downhole tractor curve 510 reveals a shift in load capacity from about 2,500 lbs. up to about 4,750 lbs. Thus, with specific reference to the chart of FIG. 5, the assembly depicted may move from a total load capacity of about 7,500 lbs. to in excess of about 10,000 lbs. (note the 11,000 lbs. depicted). In a practical sense, this may have a dramatic effect on the total attainable well depth of the assembly.

By way of brief explanation, the reduction in flow rate leading to the increase in overall load capacity is a function of the inherent pressure drop found in the hydraulic lines which deliver hydraulic power to the tractors. The amount of this pressure drop is variable, depending upon the flow rate through these hydraulic lines. Thus, as flow rate is reduced, pressure loss is reduced and the amount of pressure provided to the tractors (e.g. via the chambers 225, 250 of FIG. 2) is increased, thereby increasing load capacity. However, given that reduced flow rate does slow down the advancement of the assembly to a degree, the reduction in flow may be tailored to an operator's particular needs at any given point in time. So, for example, with reference to FIG. 5A, where a total load capacity of about 9,750 lbs. is sufficient, the operator may elect to utilize about 4 GPM flow as shown at location a. Alternatively, the operator may utilize 2 GPM to provide a load capacity of 10,750 lbs. as depicted at location b, or 1 GPM to provide a load capacity of about 11,000 lbs. as depicted at location c and described above.

In addition to increasing the overall load capacity of the assembly as described above, it is also worth noting that as the flow rate is reduced, sharing of the total load between the tractors becomes more balanced. This is an inherent result of the reduction in the amount of pressure that is lost in the hydraulic lines of the assembly as the flow is reduced. For example, returning to the chart of FIG. 5A, it is apparent that at about 4 GPM (i.e. location a) the disparity in load capacity of the tractors is about 1,750 lbs. whereas at about 1 GPM (location c) the disparity is down to only about 1,000 lbs. In this case, the downhole tractor provides a load capacity that amounts to over about 45% of the total capacity of the assembly and thus, a substantially balanced load between the tractors. In many circumstances it would not be uncommon to see a load threshold of between about 7,000 lbs. and about 9,000 lbs. Thus, balancing of the load in this manner also reduces strain on the uphole tractor and the likelihood of failure during downhole advancement.

Figure 5B:
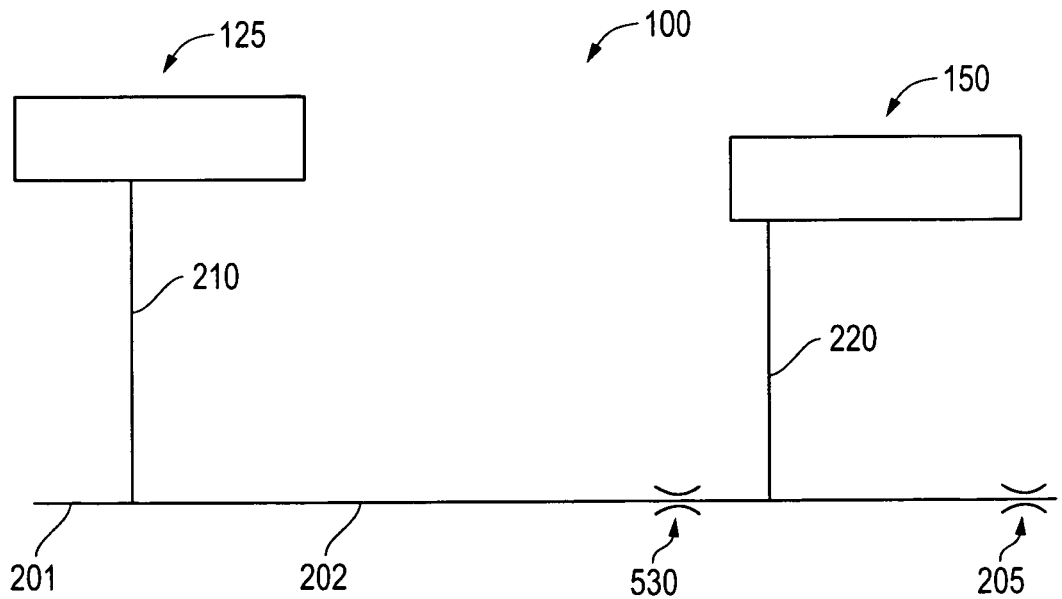
FIG. 5B is a hydraulic schematic of an embodiment of the assembly of FIGS. 1-4 with a choke disposed immediately adjacently uphole of the downhole tractor.

Continuing now with reference to FIG. 5B, a hydraulic schematic of the assembly 100 of FIGS. 1-4 is shown. However, in this embodiment, a supplemental choke 530 is disposed immediately adjacently uphole of the downhole tractor 150. That is, returning to the schematic of FIG. 2, the supplemental choke 530 is positioned at the intermediate line 202. Although, it may be positioned in the downhole tractor line 220 as well. In this manner, pressure may be driven up to a degree in advance of the downhole tractor 150. Thus, the load capacity of the downhole tractor 150 may similarly be driven up closer to that of the uphole tractor 125. In one embodiment a reduced flow rate as detailed with reference to FIG. 5A may be employed in combination with the supplemental choke 530 as shown in FIG. 5B. In such an embodiment, the load capacity of the downhole tractor 150 is at least about 48% of the total load capacity of the assembly 100. Thus, a substantial balance of load capacity between the tractors 125, 150 may be achieved.

Figure 6:
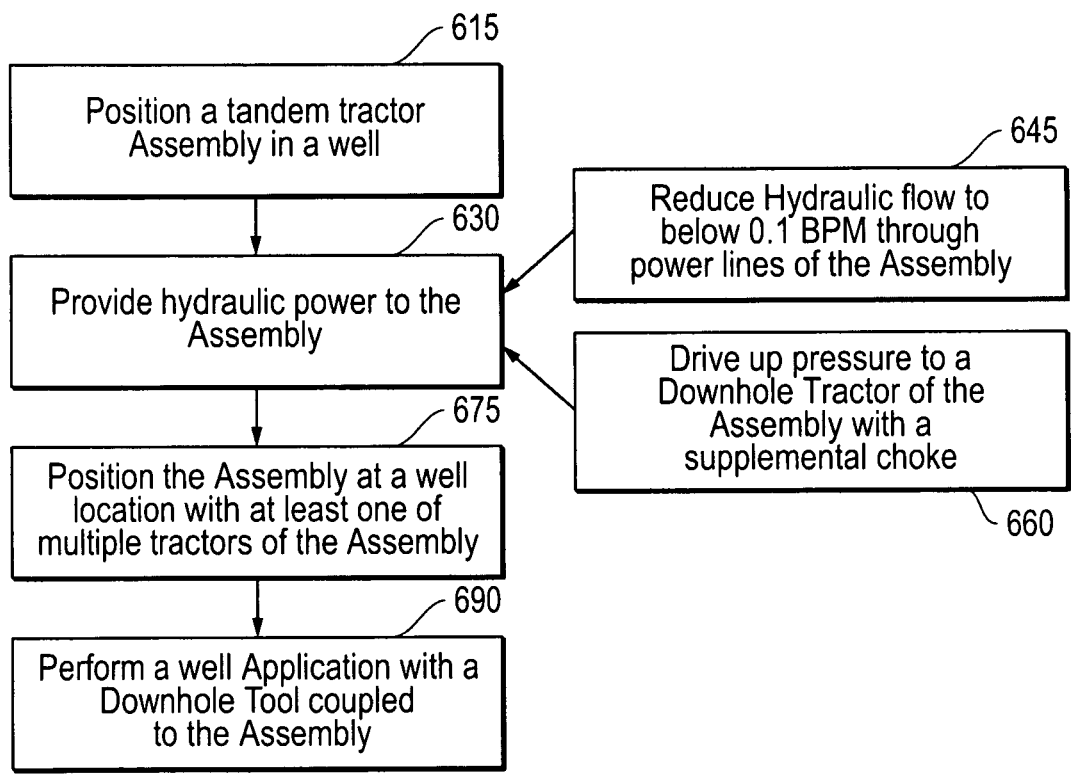
FIG. 6 is a flow-chart summarizing an embodiment of employing a hydraulically driven tandem tractor assembly in a well.

Referring now to FIG. 6, a flow-chart is depicted summarizing an embodiment of employing a hydraulically driven tandem tractor assembly as detailed hereinabove. The assembly is positioned in a well and hydraulically powered as noted at 615 and 630. The use of a tandem or multiple tractor configuration alone, substantially extends the attainable well depth of the assembly. However, additional measures may be taken as indicated at 645 and 660 in the form of reduced hydraulic flow and/or the utilization of a supplemental choke near the downhole tractor to even further improve the load capacity and ultimate attainable depth of the assembly. Furthermore, as described above, such measures may be employed alone or in combination and have the added benefit of balancing the load shared among the tractors of the assembly so as to avoid undue strain on any given tractor thereof.

The hydraulically powered assembly may be positioned at a location in the well as indicated at 675. Indeed, where necessary, the availability of multiple tractors may allow for continued advancement of the assembly to the location even where one of the tractors is unable to contribute to the advancement due to malfunction, well conditions, etc. Furthermore, as indicated at 690, a well application may ultimately be performed with a downhole tool coupled to the assembly (e.g. such as a clean out application as depicted in FIG. 3).

All in all, embodiments of downhole tractor assemblies detailed herein may be employed to extend the reach of coiled tubing in a well, particularly those of a highly deviated nature. This is due to the substantially improved load carrying capacity of the assembly attained by the employment of multiple hydraulically driven tractors. Thus, the reach of the assembly may not be limited to the limitations inherent in any single tractor in terms of load. Indeed, embodiments of tandem assemblies detailed herein above may provide for total load capacity of substantially greater than 5,000 lbs. which may translate to a tractoring depth of more than 10,000 feet through a well of deviated character.

The preceding description has been presented with reference to presently preferred embodiments. Persons skilled in the art and technology to which these embodiments pertain will appreciate that alterations and changes in the described structures and methods of operation may be practiced without meaningfully departing from the principle, and scope of these embodiments. For example, while assemblies are detailed herein utilizing two tractors, more than two tractors may be employed. Additionally, chokes beyond the supplemental choke detailed in relation to FIG. 5B may be employed throughout hydraulic lines of the assembly to further refine and tailor hydraulic parameters throughout the assembly. Similarly, hydraulic lines themselves may be reconfigured. Such a reconfiguration may include coupling the downhole tractor line 220 to the primary hydraulic line 201 immediately adjacent its coupling to the uphole tractor line 210. In this manner pressure losses, and thus power, to the tractors 125, 150 may be more evenly distributed (see FIG. 2). Regardless the potential modifications, the foregoing description should not be read as pertaining only to the precise structures described and shown in the accompanying drawings, but rather should be read as consistent with and as support for the following claims, which are to have their fullest and fairest scope.

We claim:

1. A tractor assembly for downhole advancement in a well, the assembly comprising:
    an uphole tractor having first uphole and downhole sondes for interchangeably engaging a wall of the well;
    a downhole tractor adjacent said uphole tractor, said downhole tractor having second uphole and downhole sondes for interchangeably engaging a wall of the well; and
    a singular hydraulically driven piston disposed through each of the first uphole and downhole sondes and the second uphole and downhole sondes, the piston configured to actuate each of the sondes to engage with the wall of the well and to drive the advancement of the tractor.

2. The tractor assembly of claim 1 wherein each of the first and second uphole and downhole sondes are equipped with anchors for the engaging.

3. The tractor assembly of claim 1 wherein each of the first and second uphole and downhole sondes are equipped with a housing to accommodate said singular hydraulically driven piston therethrough.

4. The tractor assembly of claim 3 further comprising:
an uphole tractor line coupled to the housing of the first uphole sonde;
a downhole tractor line coupled to the housing of the second uphole sonde; and
a hydraulic supply line coupled to each of said uphole tractor line and said downhole tractor line in succession for pressurization of the housings of the uphole sondes.

5. The tractor assembly of claim 4 wherein said downhole tractor line is coupled to said hydraulic supply line immediately adjacent the coupling of said uphole tractor line to distribute the pressurization substantially equally among the housings of the uphole sondes.

6. The tractor assembly of claim 4 further comprising a supplemental choke disposed in one of said downhole tractor line and said hydraulic supply line downhole of the coupling of said uphole tractor line thereto, said supplemental choke to drive up pressure to the housing of the second uphole sonde for balancing of the pressurization among the uphole sondes.

7. The tractor assembly of claim 4 wherein said singular hydraulically driven piston comprises:
a first head disposed in the housing of the first uphole sonde and responsive to the pressurization for providing a load capacity to the uphole tractor; and
a second head disposed in the housing of the second uphole sonde and responsive to the pressurization for providing a load capacity to the downhole tractor.

8. The tractor assembly of claim 7 wherein a load capacity thereof is obtained from a combination of the load capacities of said uphole and downhole tractors, the load capacity of said downhole tractor being at least about 33% of the load capacity of the assembly.

9. The tractor assembly of claim 8 wherein the load capacity thereof is in excess of about 7,500 lbs.

10. The tractor assembly of claim 3 the singular hydraulically driven piston comprises piston heads disposed in each of the housings of each of the first and second uphole and downhole sondes.

11. The tractor assembly of claim 1 further comprising a third tractor adjacent said downhole tractor and having third uphole and downhole sondes for interchangeably engaging the wall, said singular hydraulically driven piston disposed through the third uphole and downhole sondes for actuation of the engaging thereof.

12. A coiled tubing assembly for advancing downhole in a well, the assembly comprising:
a hydraulically driven tandem tractor assembly comprising a plurality of sondes actuated by a singular hydraulic piston extending through each of the sondes for hydraulically driving the tractor assembly;
a coiled tubing coupled to said hydraulically driven tandem tractor assembly; and
a downhole tool coupled to said hydraulically driven tandem tractor assembly for a well application at a downhole location in the well, wherein the downhole location is in excess of about 10,000 feet in the well.

13. A method comprising:
positioning a hydraulically driven tandem tractor assembly in a well, the tandem tractor assembly comprising an uphole tractor and a downhole tractor, each of the tractors comprising a first and a second sonde;
hydraulically powering the interchangeably operable tractors of the assembly with a singular hydraulically driven piston extending through each of the sondes of the tractors; and
driving the assembly to a downhole location in the well with the tractors by shifting position of the piston.

14. The method of claim 13 further comprising performing a well application at the downhole location with a downhole tool coupled to the assembly.

15. The method of claim 13 wherein said driving comprises interchangeably actuating anchor arms of uphole sondes and downhole sondes of the separate tractors for engaging a wall of the well.

16. The method of claim 15 further comprising maintaining said driving of the assembly with one of the tractors upon failure of the engaging of one of the sondes of the other tractor.

17. The method of claim 16 wherein the failure of the engaging is due to one of mechanical failure of the other tractor and the diameter of the well at the other tractor.

18. A method of distributing a load accommodated by a tandem tractor assembly in a well, the method comprising:
hydraulically powering an interchangeably operable uphole tractor of the assembly to obtain a load capacity thereof;
hydraulically powering a interchangeably operable downhole tractor of the assembly to obtain a load capacity thereof, the load capacities together accounting for the load accommodated by the assembly, wherein the uphole and downhole tractors each comprise a first and second sonde and wherein the tractors are hydraulically powered by a singular hydraulic piston extending through each of the sondes; and
hydraulically balancing the load capacities relative to one another using a hydraulic supply line coupled to hydraulics of a coiled tubing attached to the tandem tractor assembly.

19. The method of claim 18 wherein said balancing comprises maintaining a hydraulic flow rate to each of the tractors at below about 0.1 BPM.

20. The method of claim 19 wherein the load capacity of the downhole tractor accounts for at least about 45% of the load accommodated by the assembly.

21. The method of claim 18 wherein said balancing comprises employing a supplemental choke disposed in a hydraulic line between the tractors to drive up hydraulic pressure to the downhole tractor.

22. The method of claim 18 wherein said balancing comprises:
maintaining a hydraulic flow rate to each of the tractors at below about 0.1 BPM; and
employing a supplemental choke disposed in a hydraulic line between the tractors to drive up hydraulic pressure to the downhole tractor.

23. The method of claim 22 wherein the load capacity of the downhole tractor accounts for at least about 48% of the load accommodated by the assembly.

* * * * *